US011315357B2

(12) United States Patent
Yankov et al.

(10) Patent No.: US 11,315,357 B2
(45) Date of Patent: Apr. 26, 2022

(54) SINGLE-FEATURE FINGERPRINT RECOGNITION

(71) Applicant: Fingerprint Cards AB, Gothenburg (SE)

(72) Inventors: Metodi Yankov, Ballerup (DK); Søren Skovgaard Christensen, Dyssegaard (DK); Pedro Højen-Sørensen, Allerød (DK); Mikkel Stegmann, Vanløse (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/993,386

(22) Filed: Aug. 14, 2020

(65) Prior Publication Data
US 2021/0056283 A1    Feb. 25, 2021

(30) Foreign Application Priority Data

Aug. 23, 2019    (SE) .................................... 1950970-2

(51) Int. Cl.
*G06V 40/12*     (2022.01)
*G06V 40/13*     (2022.01)
*G06F 21/32*     (2013.01)

(52) U.S. Cl.
CPC .......... *G06V 40/1359* (2022.01); *G06F 21/32* (2013.01); *G06V 40/13* (2022.01); *G06V 40/1365* (2022.01)

(58) Field of Classification Search
None
See application file for complete search history.

(56) References Cited

U.S. PATENT DOCUMENTS

| 5,982,913 A | * | 11/1999 | Brumbley | .......... | G06K 9/00087 |
| | | | | | 382/124 |
| 9,483,679 B2 | | 11/2016 | Neskovic et al. | | |

(Continued)

FOREIGN PATENT DOCUMENTS

| EP | 1066589 A2 | 1/2001 |
| WO | 9951138 A2 | 10/1999 |
| WO | 2019067934 A1 | 4/2019 |

OTHER PUBLICATIONS

Chinchole, N. et al., "Review of Fingerprint Recognition methods using Extended Features," International Journal of Engineering Research and Management (IJERM), vol. 5, Issue 5, May 2018, 5 pages.

(Continued)

*Primary Examiner* — Nicholas J Lee
(74) *Attorney, Agent, or Firm* — RMCK Law Group, PLC

(57) ABSTRACT

The present disclosure relates to methods and devices for fingerprint recognition. In an aspect, a method of a fingerprint sensing system of extracting at least one fingerprint descriptor from an image captured by a fingerprint sensor for enrolment in the fingerprint sensing system is provided. The method comprises capturing images of a finger contacting the fingerprint sensor, detecting at least one fingerprint feature in each captured image, extracting fingerprint data from an area surrounding a location of the detected feature in each captured image, and extracting a fingerprint descriptor by performing a transform of the fingerprint data extracted from the area surrounding the location of the detected feature in each captured image, wherein a size of the area is selected such that the area comprises sufficient information to allow a duplicated descriptor to be discarded for the captured images.

14 Claims, 7 Drawing Sheets

(56) References Cited

U.S. PATENT DOCUMENTS

| | | | |
|---|---|---|---|
| 2004/0202355 A1* | 10/2004 | Hillhouse | G06K 9/00087 382/124 |
| 2013/0272586 A1* | 10/2013 | Russo | G06V 40/50 382/124 |
| 2014/0331059 A1 | 11/2014 | Rane et al. | |
| 2016/0378317 A1* | 12/2016 | Tian | G06K 9/00013 345/173 |
| 2017/0004295 A1* | 1/2017 | Kim | G06K 9/34 |
| 2018/0173920 A1 | 6/2018 | Jonsson et al. | |
| 2018/0267666 A1* | 9/2018 | Park | G06F 3/0412 |

OTHER PUBLICATIONS

Garg, R. et al., "A Keypoint Descriptor For Alignment-Free Fingerprint Matching," 2013 IEEE International Conference on Acoustics, Speech and Signal Processing, Vancouver, Canada, pp. 2994-2998.

Kisel, A. et al., "Fingerprint Minutiae Matching without Global Alignment Using Local Structures," Informatica, 2008, vol. 19, No. 1, pp. 31-44.

Swedish Search Report dated Feb. 20, 2020 for Swedish Patent Application No. 1950970-2, 3 pages.

Yang, J., "Non-minutiae based fingerprint descriptor," Chapter in "Biometrics," ed. J. Yang, IntechOpen (Jun. 2011), DOI: 10.5772/21642, 21 pages.

Yang, J.C. et al., "A fingerprint verification algorithm using tessellated invariant moment features," Neurocomputing 71(2008), pp. 1939-1946.

\* cited by examiner

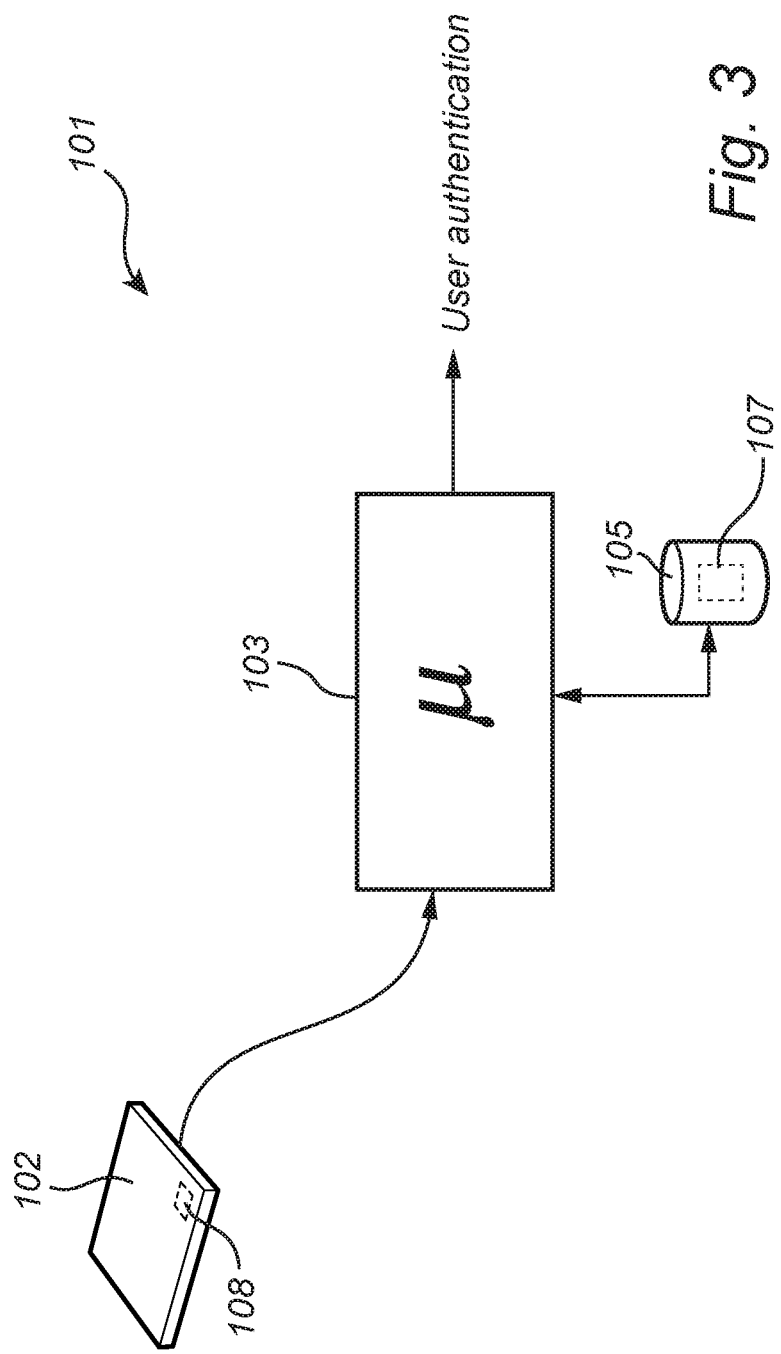

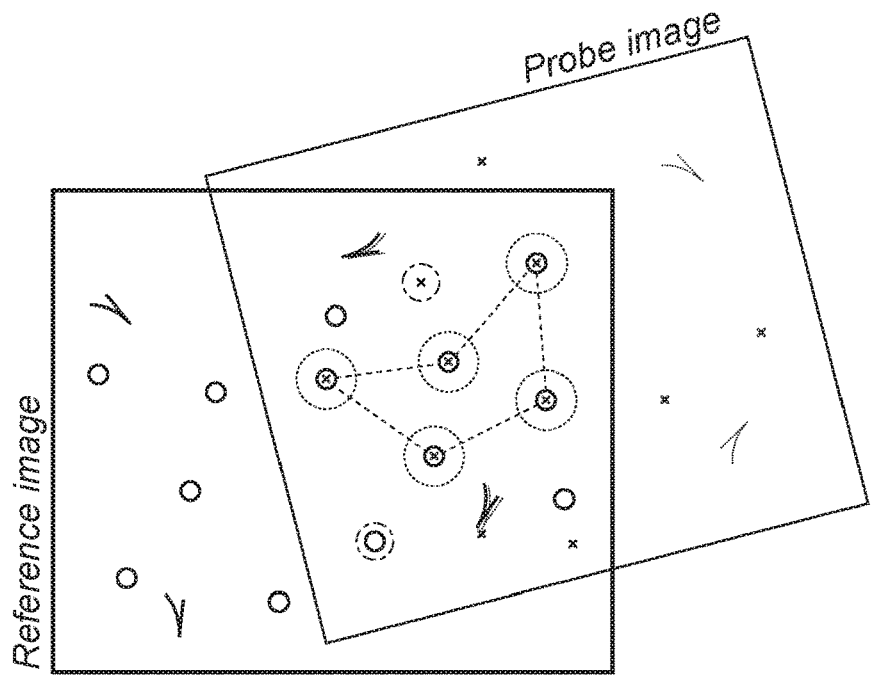

| | |
|---|---|
| ⋎ | Minutia in probe image |
| ⋎ | Minutia in reference image |
| × | Extended features in probe image |
| ○ | Extended features in reference image |
| ⊗ | Geometrically consistent features with matching descriptors |
| ○ | Small texture area, used to describe a feature in a prior art system |
| ⊚ ⊗ | False matches: Pair of features with matching descriptors, which do not fall into the same geometric configuration as most other pairs |

*Fig. 4*

SINGLE-FEATURE FINGERPRINT RECOGNITION

CROSS-REFERENCE TO RELATED APPLICATIONS

This application claims priority to Swedish Patent Application No. 1950970-2, filed on Aug. 23, 2019. The disclosure of the above application is hereby incorporated by reference in its entirety.

TECHNICAL FIELD

The present disclosure relates to methods and devices for fingerprint recognition.

BACKGROUND

Fingerprints are historically and typically described by their minutiae, which are most commonly formed by fingerprint ridge endings and bifurcations.

A typical finger contains 30 to 80 minutiae. Each minutia is described by its type, location in the image and orientation on the image. A standard matching algorithm extracts the minutiae from a reference image (i.e. a template image) and a probe image, and then finds the geometric transformation between the two minutia configurations.

The transformation is found using optimization algorithms, typically iterative. The biometric score is a function of the number of minutiae which conform to the same transformation. Due to the limited number of available minutiae, the points of interest can be extended to general points of high information content. Those are referred to as features below. The description of these features is non-standard with varying solutions depending on the application but is generally a function of the area of the fingerprint image, surrounding the feature location. When the number of features is increased in this manner, the optimization algorithm for finding the geometric transformation from one feature set to another may become computationally expensive.

SUMMARY

An objective is to find an efficient description of general features of interest beyond minutiae which allow for low-complexity fingerprint matching algorithms.

This object is attained in a first aspect by a method of a fingerprint sensing system of extracting at least one fingerprint descriptor from an image captured by a fingerprint sensor for enrolment in the fingerprint sensing system. The method comprises capturing images of a finger contacting the fingerprint sensor, detecting at least one fingerprint feature in each captured image, extracting fingerprint data from an area surrounding a location of the detected feature in each captured image, and extracting a fingerprint descriptor by performing a transform of the fingerprint data extracted from the area surrounding the location of the detected feature in each captured image, wherein a size of the area is selected such that the area comprises sufficient information to allow a duplicated descriptor to be discarded for the captured images.

This object is attained in a second aspect by a fingerprint sensing system comprising a fingerprint sensor and a processing unit, the fingerprint sensing system being configured to extract at least one fingerprint descriptor from an image captured by the fingerprint sensor for enrolment in the fingerprint sensing system. The fingerprint sensor is configured to capture images of a finger contacting the fingerprint sensor. The processing unit is configured to detect at least one fingerprint feature in each captured image, extract fingerprint data from an area surrounding a location of the detected feature in each captured image, and to extract a fingerprint descriptor by performing a transform of the fingerprint data extracted from the area surrounding the location of the detected feature in each captured image, wherein a size of the area is selected such that the area comprises sufficient information to allow a duplicated descriptor to be discarded for the captured images.

This object is attained in a third aspect by a method of a fingerprint sensing system of extracting at least one fingerprint descriptor from an image captured by a fingerprint sensor of the fingerprint sensing system for matching. The method comprises capturing an image of a finger contacting the fingerprint sensor, detecting at least one fingerprint feature in the captured image, extracting fingerprint data from an area surrounding a location of the detected feature in the captured image, extracting a fingerprint descriptor by performing a transform of the fingerprint data extracted from the area surrounding the location of the detected feature in the captured image, and matching the extracted fingerprint descriptor to at least one fingerprint descriptor previously enrolled according to the method of the first aspect.

This object is attained in a fourth aspect by a fingerprint sensing system comprising a fingerprint sensor and a processing unit, the fingerprint sensing system being configured to extract at least one fingerprint descriptor from an image captured by the fingerprint sensor for matching. The fingerprint sensor is configured to capture an image of a finger contacting the fingerprint sensor. The processing unit is configured to detect at least one fingerprint feature in the captured image, extract fingerprint data from an area surrounding a location of the detected feature in the captured image, extract a fingerprint descriptor by performing a transform of the fingerprint data extracted from the area surrounding the location of the detected feature in the captured image, and to match the extracted fingerprint descriptor to at least one fingerprint descriptor previously having been enrolled as set out in the second aspect.

Hence, during enrolment, a number of reference images are captured and at least one feature is detected in each captured image. Upon extracting fingerprint texture data from an area around the detected feature in the captured images, a much greater area is selected as compared to the prior art approach during both enrolment of a fingerprint and the subsequent authentication of a fingerprint.

A single detected feature location may serve as a basis for extracting a descriptor from a selected area surrounding the detected feature location. From this relatively large area, fingerprint texture data is extracted. Thereafter, the descriptor is extracted by performing a transform of the fingerprint texture data extracted from the selected area.

For instance, the extracted fingerprint texture data may be transformed using a set of nonlinear functions, optimized for biometric performance and applied to the fingerprint texture data.

By carefully selecting a size of the area to be sufficiently great, i.e. such that the fingerprint texture data extracted from the area contains a sufficient amount of information, it is advantageously possible to discard any descriptors being duplicated among the reference images.

Descriptors which are sufficiently similar are assumed to represent the same fingerprint area (since they are assumed to have been transformed from the same fingerprint texture data having been extracted from the area surrounding a detected feature location in a reference image). Advantageously, sufficiently similar descriptors—i.e. duplications—can thus be discarded, and areas with the same appearance are stored only once, instead of once per reference image.

In an embodiment, for a user for which the extracted fingerprint descriptor matches the at least one fingerprint descriptor previously enrolled is, authentication is successful.

In an embodiment, a size of the area surrounding the location of the detected feature is selected to be the same as the size of the area selected during enrolment.

In an embodiment, the extracted descriptor is matched to a single previously enrolled fingerprint descriptor.

In an embodiment, the size of the area is selected to be 5-7 mm$^2$.

In an embodiment, the size of the area is selected to be around 50×50 pixels on the fingerprint sensor.

In an embodiment, any location information of the detected features is discarded.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 3 shows a fingerprint sensor being part of a fingerprint sensing system according to an embodiment;

FIG. 4 illustrates a prior art fingerprint recognition approach;

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
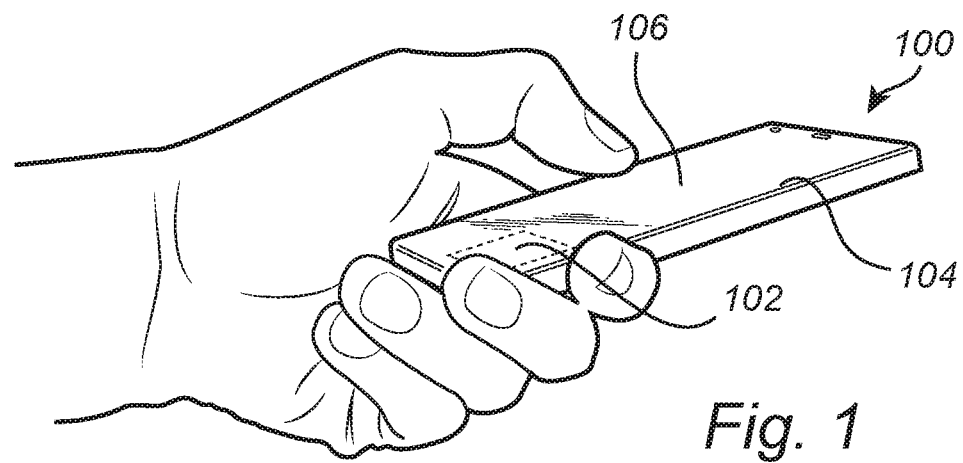
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
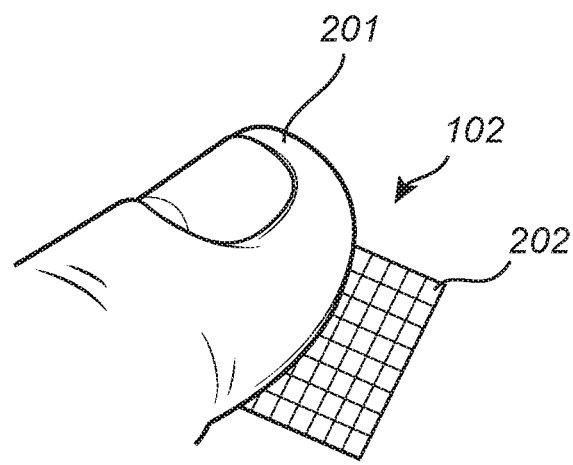
FIG. 2 shows a view of a fingerprint sensor onto which a user places the finger.

FIG. 2 illustrates a somewhat enlarged view of the fingerprint sensor 102 onto which a user places her finger 201. The fingerprint sensor 102 is configured to comprise a plurality of sensing elements. A single sensing element (also denoted as a pixel) is in FIG. 2 indicated by reference numeral 202.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random-access memory (RAM) may be embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised previously enrolled fingerprint templates pre-stored in the memory 105.

The fingerprint sensor 102 may be implemented using any kind of current or future fingerprint sensing principle, including for example capacitive, optical, ultrasonic or thermal sensing technology.

In a general authorization process, the user places a finger 201 on the display surface 104 arranged above the sensor 102 for the sensor to capture an image of the fingerprint of the user. The processing unit 103 evaluates the captured fingerprint and compares it to one or more enrolled authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a RAM, a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

As previously mentioned, a problem in the art is to efficiently describe general features of high information content and design a complexity-manageable matching algorithm.

In order to increase the number of points of interest (referred to as features in the following), locations containing a high amount of biometric information in their surrounding area can be detected. This can be done by searching for disturbances in the regular ridge flow.

The descriptor of minutiae (i.e. {type, orientation}) does not support general features, since their type is not clearly defined. The descriptor is generally a function of the area surrounding the feature location that allows features, originating from the same location on the same finger, but captured in different periods and/or by different acquisition systems to be paired with each other. Pairing is typically achieved if some distance function of the two descriptors is below a threshold.

In a descriptor-based feature extraction and matching approach, the descriptors in the pre-stored reference/template image and the captured probe image are first matched against each other in order to extract the matching pairs of descriptors. Due to variability of the fingerprint acquisition, a pairing descriptor in the probe image is not found for every descriptor in the reference image, and vice versa. Thus, a set of pairs is obtained, generally smaller than the descriptor set of the probe image or the reference image.

If pairing descriptors indeed originate in the same finger, the geometric configuration of the feature locations in the probe image should match the geometric configuration of the feature locations in the reference. Since there can be false matches in the matching pair subset, not all pairs will fall into the common geometric configuration (see FIG. 4). An optimization algorithm is executed to estimate the common geometric configuration which applies to most pairs. This optimization can be computationally expensive, but necessary in order to trim the false matching pairs. The final score is usually a function of the number of feature pairs, which conform to the same geometric transformation.

A brief example of this well-known fingerprint recognition system is given in FIG. 4. If an insufficient number of minutiae are present in the images, the feature set is extended to general locations of high information content. In this example 13 features have been detected in the reference image, while 11 features have been detected in the probe image.

A small area around each feature location is used to extract a descriptor. This is typically performed for each detected feature in the reference image and in the probe image. However, in FIG. 4 only the area around the respective one of the finally matching descriptors is shown, i.e. the five matching descriptor pairs. When the area is small, the number of false matching pairs can be high, but the geometric consistency estimation prunes away false matches.

Hence, 11 features are detected in the probe image and fingerprint texture data located in a small area around each of these 11 features are then extracted (even though only the area of each of the five matching descriptors are shown) and transformed in order to extract 11 corresponding descriptors in the probe image. The descriptor pairs each formed by a descriptor of the reference image and of the probe image, respectively, are tested for geometrical consistency in order to obtain five matching and geometrically consistent descriptor pairs and the final score.

Poor selection of the size of the area, used for extraction of descriptors and inefficient descriptor extracting function requires a lot of redundancy in terms of the number of features per image in order to achieve satisfactory biometric performance. Inefficient descriptors thus result in high matching complexity and memory requirements.

Small active area of the fingerprint sensor, e.g. due to low coverage of the sensor by the finger or small sensor size, is further problematic for minutiae-based algorithms since it results in even fewer available features. A combination of reference images can be used to increase the total number of available features by way of combining the features in multiple images, e.g. by stitching. When the overlap of the reference images is insufficient or there are too few features in their overlapping area, the (features of the) two images cannot be easily combined and the reference images must be used independently, resulting in poor matching performance of a probe to each.

Figure 5:
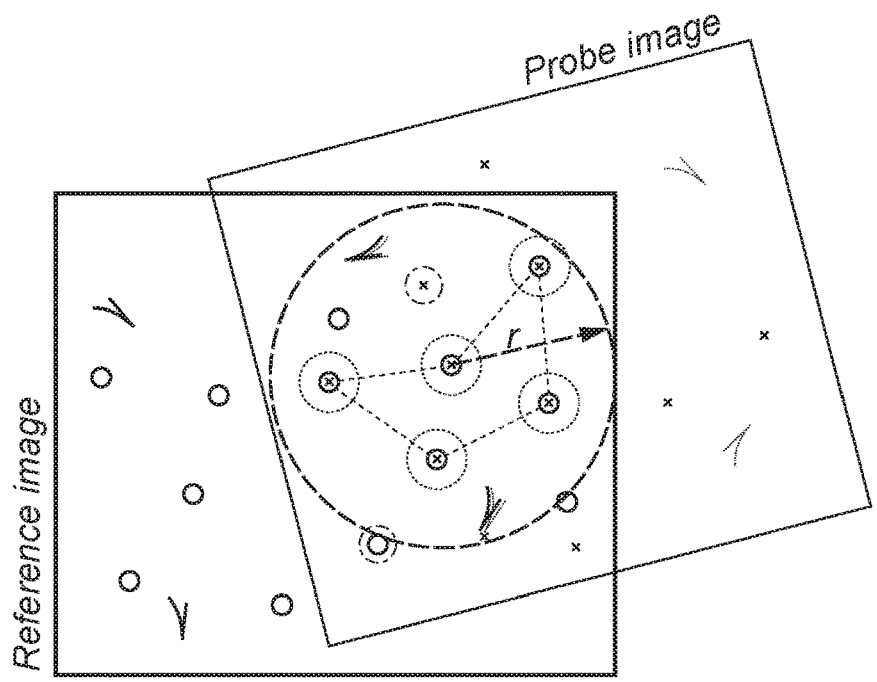
FIG. 5 illustrates a fingerprint recognition approach according to an embodiment.
Figure 6:
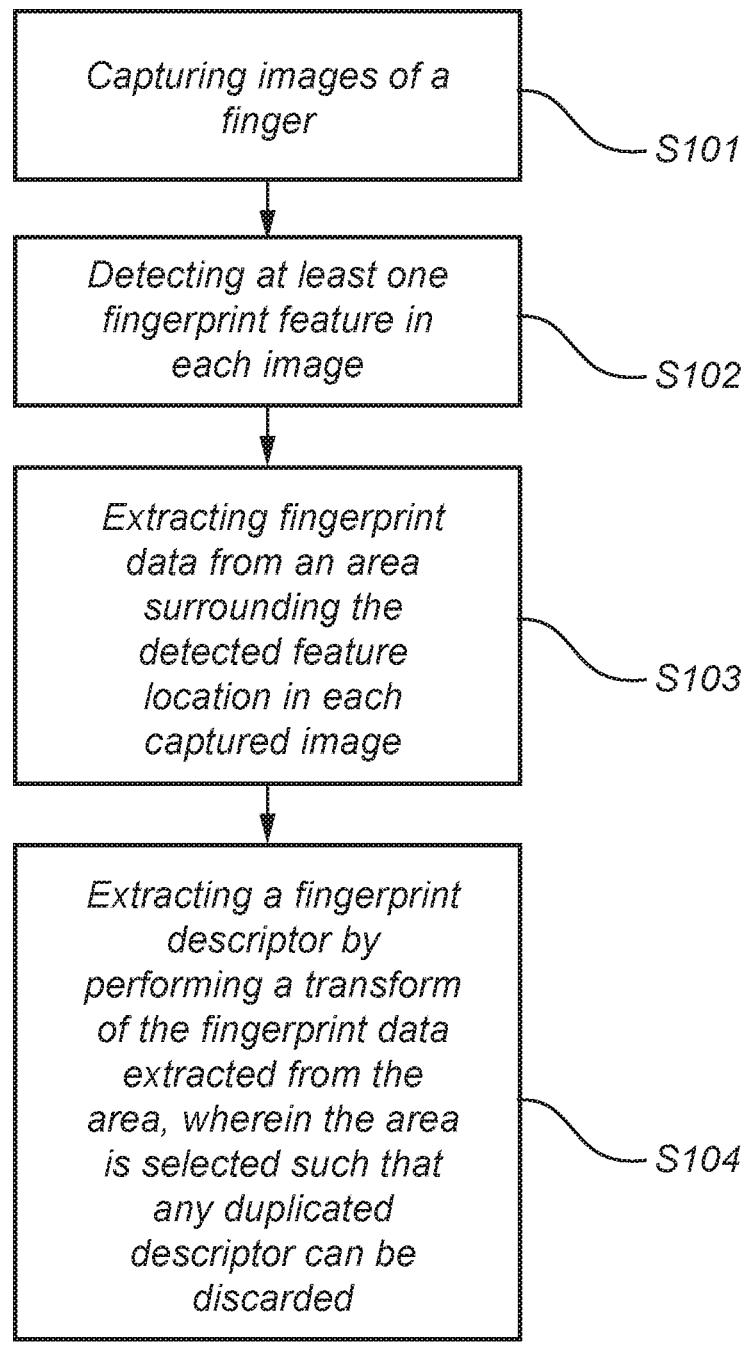
FIG. 6 illustrates a flowchart of a method according to an embodiment.

FIG. 5 illustrates an embodiment in which feature locations are detected in a captured image. Reference will further be made to FIG. 6 illustrating a flowchart of a method of enrolling a fingerprint descriptor in the fingerprint system previously described.

Hence, during enrolment, a number of reference images are captured in step S101 and at least one feature is detected in each captured image in step S102.

Upon extracting fingerprint texture data from an area around the detected feature in the captured images in step S103, a much greater area is selected as compared to the prior art approach during both enrolment of a fingerprint and the subsequent authentication of a fingerprint.

In the embodiment described with reference to FIG. 5, a single detected feature location will serve as a basis for extracting a descriptor, and the area around the feature location is in this exemplifying embodiment illustrated as being formed by a circle (but can be of any other shape), having radius. In one embodiment, the area is selected to be around 5-7 mm$^2$. From this relatively large area, fingerprint texture data is extracted.

Thereafter, the descriptor is extracted by performing a transform of the fingerprint texture data extracted from the area formed by the circle with radius r, as shown in step S104.

In an embodiment, the extracted fingerprint texture data is transformed using a set of nonlinear functions, optimized for biometric performance and applied to the fingerprint texture data. In an example, the fingerprint texture data extracted from the area may be an 8-bit grey scale image having a size of 49×49 pixels, which in its image domain is represented by 49×49×8=19208 bits. This extracted fingerprint texture data is transformed into a descriptor formed by a vector of length N, representing the response of the N nonlinear functions to the fingerprint texture data, where N<<19208. Typically, N<256.

By carefully selecting a size of the area of step S103 to be sufficiently great, i.e. such that the fingerprint texture data extracted from the area contains a sufficient amount of information, it is advantageously possible to discard any descriptors being duplicated among the reference images. This will be described in more detail in the following.

Figure 7:
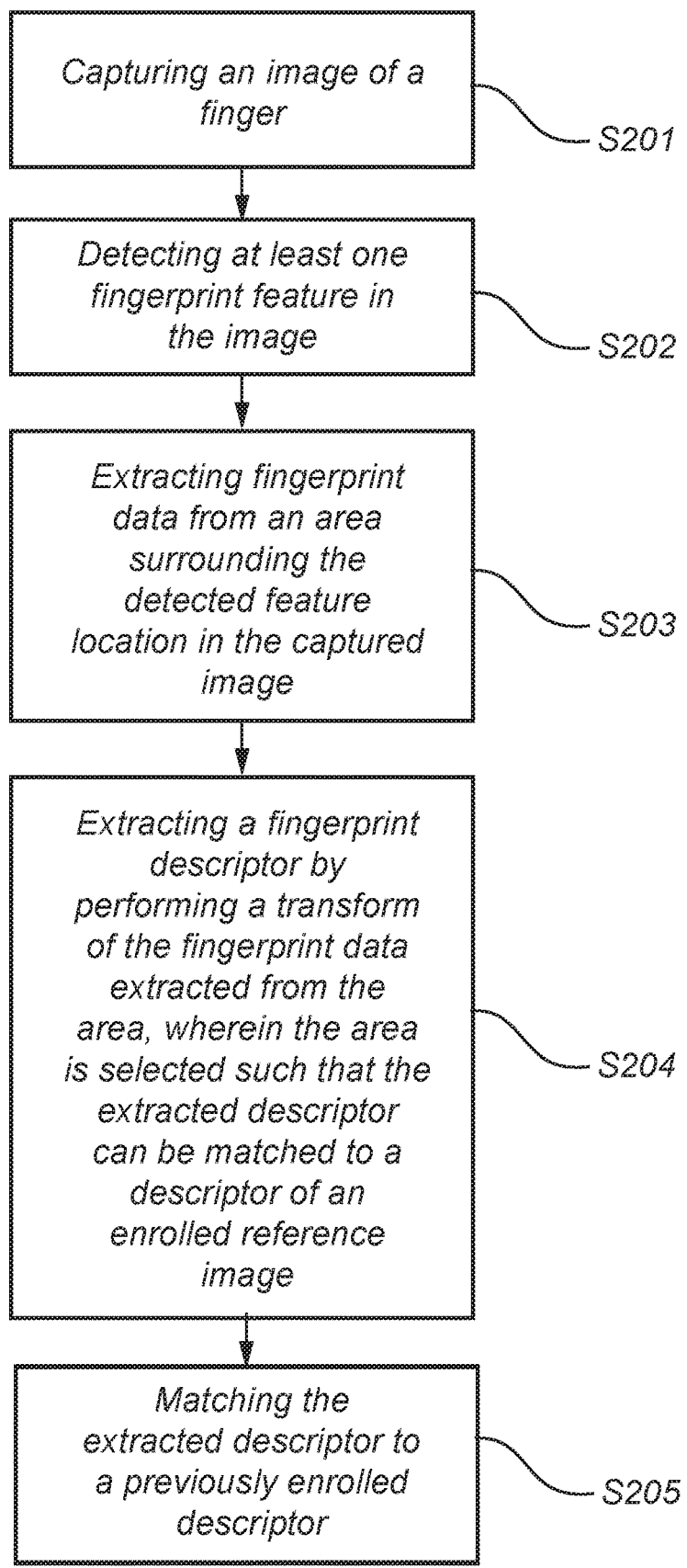
FIG. 7 illustrates a flowchart of a method according to another embodiment.

FIG. 7 illustrates a flowchart of a method of extracting a fingerprint descriptor for the purpose of performing matching against the previously enrolled reference images for successful authentication of a user. This is very similar to the enrolment process. An image is captured in step S201 and at least one feature is detected in the captured image in step S202.

Again, upon extracting fingerprint texture data from an area around the detected feature in the captured images in step S203, a much greater area is selected as compared to the prior art approach. Typically, the size of the area selected during authentication is the same (or at least similar to) the size of the area selected during enrolment of a fingerprint. Fingerprint data is thus extracted from this area and transformed in step S204 into a fingerprint descriptor as previously described.

The extracted descriptor of the captured probe image is then matched to a descriptor of the reference image(s)—having been extracted in the same way as the descriptor extracted from the probe image—thereby creating a matching descriptor pair. As previously mentioned, a few descriptors may be extracted from the probe image and compared to descriptors of each reference image until one or more matching descriptor pairs are found. Typically, upon finding a match, a user for which the extracted fingerprint descriptor matches at least one fingerprint descriptor previously enrolled is authenticated by the fingerprint system 101. This may e.g. have as a result that the host, for instance a mobile phone 100, is unlocked.

Advantageously, the invention exploits the idea that a single descriptor extracted from a larger area around a detected feature location—by means of transforming the fingerprint texture data contained in that area—as described in FIG. 5 may contain as much information, or at least nearly as much, as a total information content of a plurality of descriptors extracted from a set of small areas as performed in the art.

Thus, a match between effective descriptors extracted from two such large areas of a probe image and a reference image, respectively, is sufficient to ensure that the descriptors originate from the same location of the same fingerprint.

When using many features with small surrounding areas from which descriptors are extracted as described in the prior art approach of FIG. 4, it is necessary to ensure that not only the descriptors match, but also that the descriptors have the same relative locations in both images. In other words, feature descriptor and location matching must be ensured using the prior art approach, where a feature is constituted by a descriptor and the location of the descriptor in an image. This is commonly referred to as geometric consistency.

In the system of the invention, if the descriptors extracted from the large areas surrounding a feature location in the probe image and the reference image are found to be matching, geometric consistency is in fact ensured since the area surrounding a detected feature location inevitably is geometrically consistent within itself and any complexity inherent in the fingerprint texture data of the area is thus preserved. Thus, any location information of the detected features is advantageously discarded.

As a consequence, a single descriptor matching pair (or possibly a few pairs) between a probe image and a reference image is sufficient to compute a reliable biometric score, and explicit geometric similarity estimation for a great number of descriptors is thus no longer necessary. Advantageously, the invention thus provides for reduced processing latency and matching complexity.

Further, with the invention the probe image is not matched to complete reference images (or a stitch of multiple reference images) by matching a set of descriptors in the probe image to a corresponding set of descriptors in the reference image(s).

Rather, one or a few extracted descriptors of a probe image is matched to a set of descriptors, which can originate from different reference images, and their origin is not kept track of. All reference images are thus effectively exploited jointly for the biometric match.

Descriptors which are sufficiently similar are assumed to represent the same fingerprint area (since they are assumed to have been transformed from the same fingerprint texture data having been extracted from the area surrounding a detected feature location in a reference image). Advantageously, sufficiently similar descriptors—i.e. duplications—can thus be discarded, and areas with the same appearance are stored only once, instead of once per reference image.

Hence, for the reference images from which descriptors are extracted in the same way as for the probe image, i.e. by performing a transform of fingerprint texture data extracted from an area around a detected feature location in a captured reference image, each descriptor is stored and matched to each other descriptor for the reference images. Thereafter, any duplicate descriptors are discarded.

This may be performed efficiently and sequentially every time a new reference image is to be added to the template in the fingerprint sensing system. As a result, a database of independent reference image descriptors is advantageously created, each descriptor representing an area of sufficiently different appearance. This database may be viewed upon as a "template" to which a probe image is matched.

Figure 8:
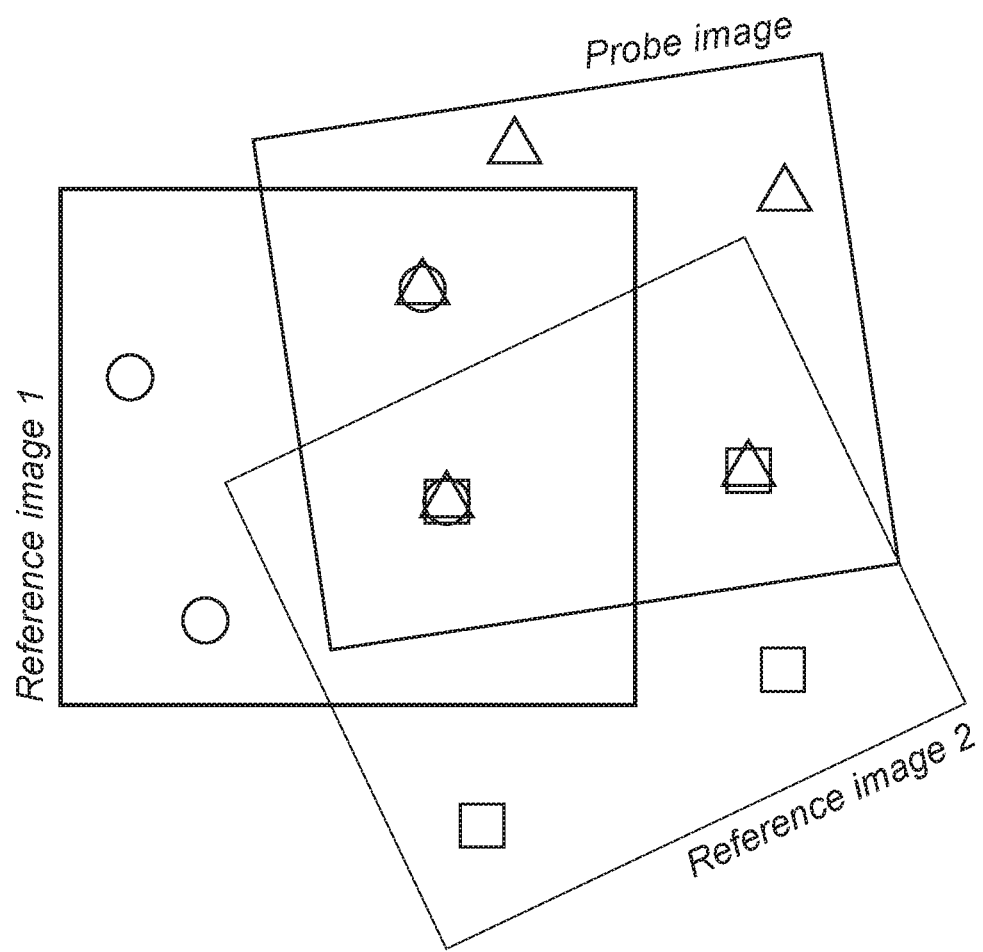
FIG. 8 illustrates some differences between the invention and the prior art.

FIG. 8 illustrates some key differences between the invention and the prior art. In this particular example, it is assumed that in a reference system a minimum of three features should conform to the same geometric transformation between two images in order to securely (i.e. with a low probability of false accept) conclude that a probe image matches a refence image.

In a prior art fingerprint recognition system, the features in the overlapping area of the two reference images (and their descriptors) are duplicated, resulting in increased memory consumption. Furthermore, even though a significant overlap exists between the probe image and both reference images, only two features exist in the respective overlapping area of the probe image and each reference image, making it impossible to attain a match. Further, a stitched template cannot be created since there is only one feature in the overlapping area of reference images 1 and 2.

To the contrary, with the invention:
- for duplicated descriptors, only one of the descriptors is stored which advantageously improves memory efficiency;
- only one descriptor is required to attain a biometric score indicating a match, assuming that the descriptor has sufficient information content (i.e. a sufficiently large set of fingerprint texture data needs to be transformed upon extracting the descriptor;

the probe has a total of 3 features in common with the template, so the score can be further improved by combining the similarity scores of all three pairs of feature descriptors.

As previously mentioned, in an embodiment the extracted fingerprint texture data is transformed using a set of non-linear functions, optimized for biometric performance. Hence, the fingerprint texture data being extracted from an area surrounding a detected feature location is transformed into a feature vector—i.e. the descriptor—which may be binary or continuous. In embodiments, similarity between features is obtained from a suitable distance function, e.g. Euclidean distance.

In order to improve the reliability of the descriptor pair-matching score, the distance function may be appended by the probability of occurrence of the feature texture area in the world. For example, descriptor pairs with a given Hamming distance will have their pair-matching scores improved, if the probability of occurrence (PoO) of the feature texture image area is low, and vice versa. In this embodiment, the feature is described by the set {descriptor, PoO}, instead of descriptor only.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of a fingerprint sensing system of extracting at least one fingerprint descriptor from an image captured by a fingerprint sensor for enrolment in the fingerprint sensing system, comprising:
capturing a plurality of images of a finger contacting the fingerprint sensor;
detecting at least one fingerprint feature in each captured image;
extracting fingerprint data from an area surrounding a location of the detected feature in each captured image; and
extracting a single fingerprint descriptor corresponding to the area by performing a transform of the fingerprint data extracted from the area surrounding the location of the detected feature in each captured image, wherein a size of the area is selected such that the area comprises sufficient information to allow a duplicated descriptor to be discarded for the plurality of captured images.

2. A method of a fingerprint sensing system of extracting at least one fingerprint descriptor from an image captured by a fingerprint sensor of the fingerprint sensing system for matching, comprising:
capturing an image of a finger contacting the fingerprint sensor;
detecting at least one fingerprint feature in the captured image;
extracting fingerprint data from an area surrounding a location of the detected feature in the captured image;
extracting a fingerprint descriptor by performing a transform of the fingerprint data extracted from the area surrounding the location of the detected feature in the captured image; and
matching the extracted fingerprint descriptor to at least one fingerprint descriptor previously enrolled according to claim 1.

3. The method of claim 2, further comprising;
authenticating a user for which the extracted fingerprint descriptor matches the at least one fingerprint descriptor previously enrolled.

4. The method of claim 2, wherein a size of the area surrounding the location of the detected feature is selected to be the same as the size of the area selected during enrolment.

5. The method of claim 2, wherein the extracted descriptor is matched to a single previously enrolled fingerprint descriptor.

6. The method of claim 1, wherein the area is selected to be 5-7 mm$^2$.

7. The method of claim 1, wherein the area is selected to be around 50×50 pixels on the fingerprint sensor.

8. The method of claim 1, further comprising:
discarding any location information of the detected features.

9. A computer program product comprising a non-transitory computer readable medium, the computer readable medium having a computer program embodied thereon comprising computer-executable instructions for causing the fingerprint sensing system to perform steps recited in claim 1 when the computer-executable instructions are executed on a processing unit included in the fingerprint sensing system.

10. A fingerprint sensing system comprising a fingerprint sensor and a processing unit, the fingerprint sensing system being configured to extract at least one fingerprint descriptor from an image captured by the fingerprint sensor for enrolment in the fingerprint sensing system, the fingerprint sensor being configured to:
capture a plurality of images of a finger contacting the fingerprint sensor; and the processing unit being configured to:
detect at least one fingerprint feature in each captured image;
extract fingerprint data from an area surrounding a location of the detected feature in each captured image; and to
extract a single fingerprint descriptor corresponding to the area by performing a transform of the fingerprint data extracted from the area surrounding the location of the detected feature in each captured image, wherein a size of the area is selected such that the area comprises sufficient information to allow a duplicated descriptor to be discarded for the plurality of captured images.

11. A fingerprint sensing system comprising a fingerprint sensor and a processing unit, the fingerprint sensing system being configured to extract at least one fingerprint descriptor from an image captured by the fingerprint sensor for matching, the fingerprint sensor being configured to:
capture an image of a finger contacting the fingerprint sensor; and the processing unit being configured to:
detect at least one fingerprint feature in the captured image;
extract fingerprint data from an area surrounding a location of the detected feature in the captured image;
extract a fingerprint descriptor by performing a transform of the fingerprint data extracted from the area surrounding the location of the detected feature in the captured image; and to
match the extracted fingerprint descriptor to at least one fingerprint descriptor previously enrolled according to claim 10.

12. The fingerprint system of claim 11, the processing unit further being configured to:
   authenticate a user for which the extracted fingerprint descriptor matches the at least one fingerprint descriptor previously enrolled.

13. The fingerprint system of claim 11, wherein a size of the area surrounding the location of the detected feature is selected to be the same as the size of the area selected during enrolment.

14. The fingerprint system of claim 11, wherein the extracted descriptor is matched to a single previously enrolled fingerprint descriptor.

\* \* \* \* \*